Feb. 3, 1942.    M. G. HILPERT    2,271,592
COMPOSITE PANEL AND STEEL ELEMENT THEREFOR
Filed March 23, 1938    3 Sheets-Sheet 1
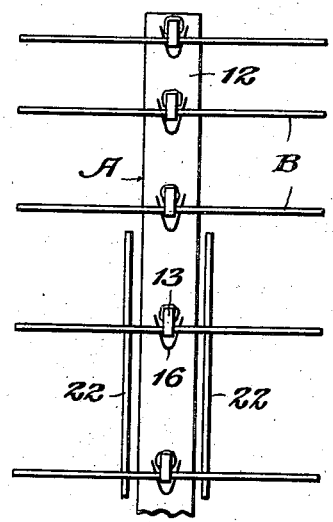
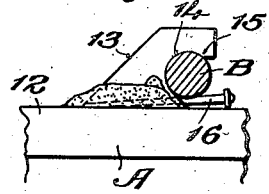
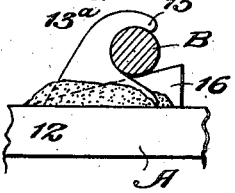
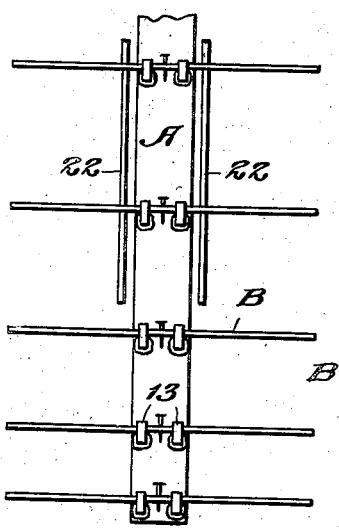
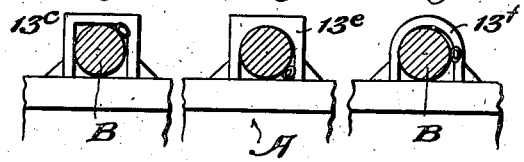
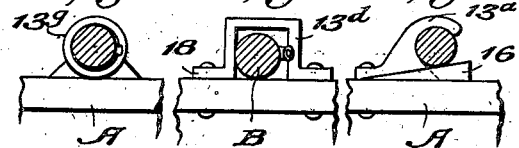
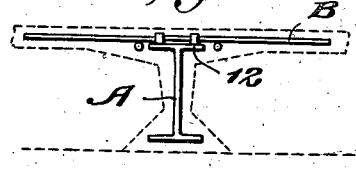
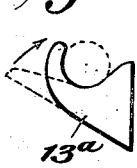
Inventor
Meier Geo. Hilpert,
By D. P. Wolhaupter
Attorney

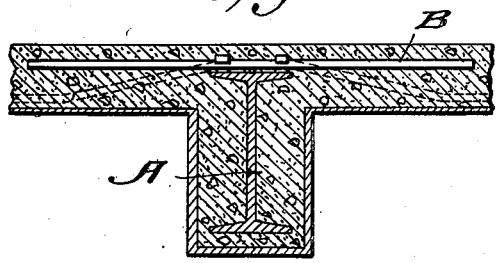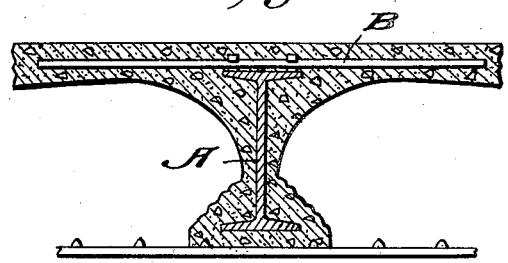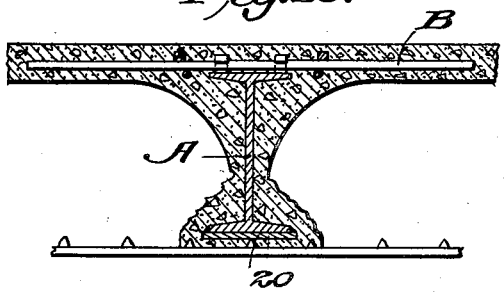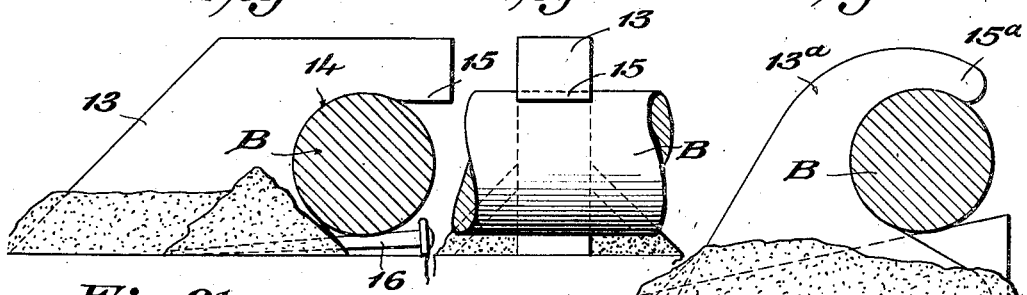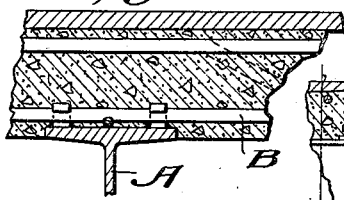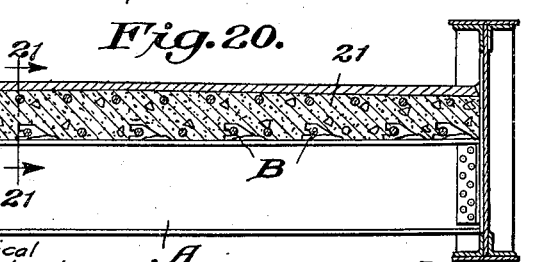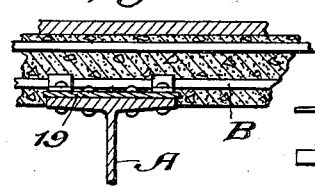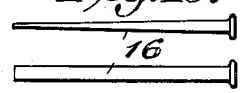

Feb. 3, 1942. M. G. HILPERT 2,271,592
COMPOSITE PANEL AND STEEL ELEMENT THEREFOR
Filed March 23, 1938 3 Sheets-Sheet 3

INVENTOR
Meier Geo. Hilpert,
BY
D. P. Wolhaupter
ATTORNEY.

Patented Feb. 3, 1942

2,271,592

UNITED STATES PATENT OFFICE 2,271,592

COMPOSITE PANEL AND STEEL ELEMENT THEREFOR

Meier George Hilpert, Bethlehem, Pa.

Application March 23, 1938, Serial No. 197,720

10 Claims. (Cl. 72—71)

This invention relates to composite panels and structural steel elements therefor such as girders, beams, joists, studs, and the like that are to have their compression flanges or edges fully or partly encased in concrete or the like, or which are to have concrete or like slabs superimposed thereon, as, for example, in the construction of floors, roofs, walls, or other parts of various different structures such as buildings, bridges and the like, and has for its general object to provide novel means to insure positive bonds between the compression flanges or edges of such structural elements and the concrete or the like which is superimposed upon or which encases said top flanges or edges, whereby the structural elements and the concrete or the like cooperate to provide composite girders, beams, joists or the like to provide with the slab a composite panel which is of superior strength and highly resistant to stresses of service to which they may be subjected.

According to the invention provision is made for fastening to the top flanges or edges of structural elements such as girders, beams, joists and the like, cross rods to extend beyond the sides of such elements into the concrete or the like that is to be superimposed upon or that is to encase said top flanges or edges, whereby the structural elements and the concrete or the like cooperate to provide composite structural elements, and in this connection a special object of the invention is to provide a simple means whereby the cross rods may be applied and fastened to structural elements rapidly, easily, securely and rigidly, to the end that the invention may be employed economically and will serve its purposes in a highly efficient manner.

With the foregoing and various other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the accompanying drawings, wherein like characters of reference denote corresponding parts in related views.

Figure 1 is a plan view of an end portion of a girder, beam, joist or the like having cross rods fastened thereto in accordance with one practical embodiment of the invention.

Figure 2 is a side elevation of the girder, beam, joist or the like shown in Fig. 1.

Figure 3 is a view similar to Fig. 1 illustrating an alternative form of the invention.

Figure 4 is a side elevation of the form of the invention illustrated in Fig. 3.

Figure 5 is an end view of the form of the invention illustrated in Figs. 3 and 4 and indicating by dotted lines the incorporation of the girder, beam, joist or the like in a floor or roof of encasing concrete.

Figure 6 is an enlarged detail sectional view illustrating one practical means for fastening the cross rods to the girders, beams, joists or the like.

Figure 7 is a detail plan view of the fastening means illustrated in Fig. 6.

Figure 8 is an enlarged view similar to Fig. 6.

Figure 9 is a view at right angles to Fig. 8 of the fastening means shown in the latter figure.

Figure 10 is a view similar to Fig. 6 illustrating an alternative form of rod fastening means.

Figure 11 is a view similar to Fig. 7 of the form of the invention illustrated in Fig. 10.

Figure 12 is an enlarged view similar to Fig. 10.

Figures 13 through 18 are views similar to Figs. 6 and 10 illustrating other possible alternative forms of the invention.

Figure 19 illustrates in side elevation and plan a cut nail which may be employed as the key element of the present rod fastening means.

Figure 20 is a sectional view illustrating a construction in which a slab of concrete or the like is superimposed upon a girder, beam, joist or the like equipped with cross rods in accordance with the invention.

Figure 21 is a cross section on the line 21—21 of Fig. 20.

Figure 22 is a view similar to Fig. 21 illustrating another alternative embodiment of the invention.

Figure 23 is a sectional view illustrating the invention as embodied in a so-called soffit construction.

Figure 24 is a view similar to Fig. 23 illustrating another embodiment of the invention.

Figure 25 is a view similar to Fig. 24 illustrating a further embodiment of the invention.

Figures 26 through 30 are detail views illustrating different manners of adding bottom flange or chord material to girders, beams, joists and the like to equalize values or strength of the large concrete top flange additions to the tops of such elements.

Figures 40 through 42 are sectional views illustrating other ways of fastening cross rods to girders, beams, joists and the like.

According to each of the different forms of the invention, a structural element, such as a girder, beam, joist or the like, is designated as A and cross rods secured to the top thereof are designated as B.

The cross rods B are used in cases where the structural elements either have concrete or like slabs superimposed thereon, as, for example, in the construction of the floors of certain types of bridges and buildings, or in cases where the top flanges or chords of the structural elements are entirely or partly encased in concrete or the like as, for example, in the construction of the floors, roofs and other parts of buildings and other structures, and, as will be understood, said cross rods, when properly designed and attached to the structural element by embedment in the concrete or the like, serve to provide proper bond between the structural elements and the concrete or the like to the end that the structural elements and the concrete or the like cooperate to form composite structures characterized by great strength and resistance to stresses and deflections.

Figures 40, 41, 42:
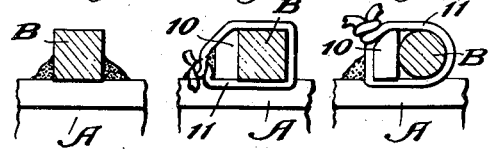

The cross rods may be of any suitable length, sectional area and sectional shape, depending upon the dimensions of the structural elements to which they are applied and the service they are to perform, and they may be fastened to the structural elements in any desired manner and in any desired spaced apart relationship. For example, they may be welded, riveted, bolted or otherwise positively secured directly to the structural elements as indicated by Fig. 40 of the drawings, or, as indicated by Figs. 41 and 42 of the drawings, the structural elements may have suitable abutments 10 welded, riveted, bolted or otherwise secured thereto and the cross rods B may be secured to such abutments in any positive manner, as, for example, by means of the wires designated as 11 or by any other suitable tie or clamp devices.

If the cross rods are fastened directly to the structure elements a very practical manner of fastening them is by welding, especially in instances where the structural elements have narrow top flanges or are devoid of top flanges, as in the case of inverted T-girders, beams, joists or the like. If, on the other hand, the cross rods are fastened to abutments such as the abutment 10, the most practicable manner of fastening the abutments to the structural elements is by welding. However, to weld cross rods or abutments to structural elements at a constructional site is seldom feasible, and, in any event, usually involves complications which can be avoided only by doing the welding at a factory or other more appropriate place. But if the rods or abutments are welded or even otherwise secured to structural elements at a place remote from the constructional site where the structural elements are to be used, there become involved various other complications anent the transportation and handling of the elements. Moreover, definite positioning of the cross rods along the structural elements in accordance with the actual horizontal shearing forces existent at different points along said elements is essential in the interest of economy, but if dependence is placed on workmen at a constructional site to properly position said rods there can be no assurance that they will be properly positioned. On the contrary, the only practicable manner of assuring that the cross rods will be properly positioned is to provide the structural elements, either at the factory or at some suitable point of fabrication, with means which predetermines the positioning of the cross rods. Accordingly, while it is within the purview of the invention to fasten the cross rods directly to the structural elements at a constructional site, or indirectly to the structural elements at a constructional site through the instrumentality of tie wires or similar means which may not afford a truly rigid fastening of the rods to the structural elements, a more practical and a generally more satisfactory practice is to provide the structural elements at the factory or at some other appropriate place of fabrication, with means which permit the cross rods to be substantially rigidly fastened to said elements in a simple manner at a constructional site, which definitely predetermine the positioning of said cross rods relative to the structural elements, and which do not cause complication in the transportation and handling of said elements, but permit them to be transported and handled with practically the same facility as ordinary structural elements.

One practical means permitting the structural elements to be handled and transported without complications and yet providing for practically rigid fastening of cross rods thereto at definitely predetermined positions and in a very facile manner at a constructional site, is illustrated in Figs. 1, 2, 6, 8 and 9 of the drawings. By reference to these figures, it will be observed that the structural element A, such as a girder, beam, joist or the like, has welded upon the top flange 12 thereof, along the middle of said flange at spaced points (Fig. 1), a series of saddle elements 13 which are or may be duplicates of one another and each of which comprises a metal body of suitable thickness welded at its bottom to the flange 12 and having formed therein an upwardly inclined slot 14 which opens through the edge of the saddle element remote from the adjacent end of the structural element.

The inner or closed end of the slot 14 of each of the saddle elements 13 corresponds in size and shape to the cross sectional size and shape of the cross rods B to be fastened to the structural element A, and in this connection the said inner or closed ends of said slots preferably, but not necessarily, are suitably machined so that the cross rods will engage snugly therewith. Moreover, the top of the inner or closed end of each slot is disposed above the edge of its mouth or open end, or, in other words, a lip 15 at the top of the open end of each slot extends downwardly below the top of the slot. Therefore, when a cross rod is seated in the said inner or closed end of the slot of any given saddle element, said rod cannot be moved horizontally out of said slot because of the obstruction by the lip 15, but, on the contrary, can only be removed by downward and outward movement. Thus, by engaging the medial portion of a cross rod B in a slot 14 and by then driving a suitable wedge 16 between the cross rod and the flange 12, the cross rod first is urged upwardly until it seats snugly in the inner or closed end of the slot and then becomes effectively locked by the wedge 16 against removal from the slot, becoming at the same time so securely interlocked with the saddle element as to be quite rigid with the same and the structural element A.

Ordinary wire or cut nails may be employed as the wedges 16 or special wedges may be provided. As illustrated in Fig. 1, wedges of substantially U-shape as viewed in plan are very suitable for use with single saddle elements as shown in said figure because they may straddle the saddle elements and their respective legs may engage the cross rods at the respective sides of the saddle elements, thus contributing toward obtaining particularly rigid interlocks between the cross rods and the saddle elements and, consequently, between the cross rods and the structural element.

The saddle elements 13 do not project appreciably from the structural elements and, therefore, offer little or no hindrance to transportation and handling of the structural elements in usual manners. At the same time, they afford a means whereby the cross rods may be quickly, easily and rigidly applied to the structural elements at definite, predetermined locations along said elements at a constructional site. In this latter connection Fig. 1 indicates that the saddle elements are disposed progressively more closely together toward the ends and more widely apart toward the middle of the structural element A, in accordance with increase in shearing forces toward the ends of said element. For any given installation the cross rods B should be fastened to the structural elements at definite locations which may, by calculations, be accurately predetermined. The saddle elements are, of course, placed at these locations. Therefore, said saddle elements afford not only a means of expeditiously and effectively applying the cross rods at a constructional site, but, what is particularly important, they serve to accurately predetermine, the locations of said rods along the structural elements.

The saddle element 13 may readily be stamped from sheet metal or they may be formed in any other suitable manner, and instead of being arranged in a single row along the middle of the flange 12 of a structural element they may be arranged in two rows or, in other words, in laterally spaced pairs along the structural elements, as indicated in Figs. 3 and 7 of the drawings. If said saddle elements are arranged in pairs the wedges 16 are employed between said saddle elements and, as is obvious, said wedges may be either in the form of nails or of the U-shaped form illustrated in detail in Figs. 10 and 11, or of any other suitable form.

Figs. 10, 10a and 11 illustrate saddle elements 13a which may be produced by rolling a suitable bar blank to a cross sectional shape corresponding to the desired side elevational shape of the saddle and then cutting said bar transversely to provide the saddle elements of desired thickness or width. Fig. 10a illustrates by dotted and full lines initial and final roll passes employed in forming the bar and Fig. 10 illustrates that the saddle elements 13a are, in all essential respects, substantially duplicates of the saddle elements 13. As will be understood, the saddle elements 13a may be employed singly or in pairs and any suitable wedge devices may be employed in conjunction with the same. Moreover, and as will be further understood, the saddle elements, regardless of their specific form, may be welded to the structural elements or may be riveted, bolted or otherwise rigidly secured thereto.

Figure 31:
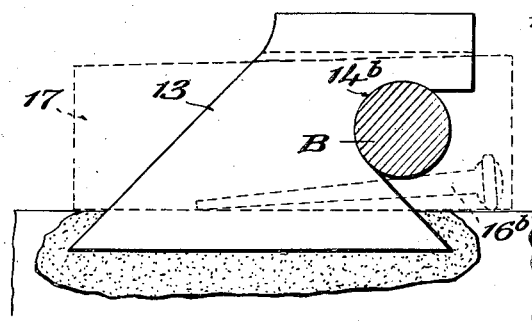
Figure 31 is a view similar to Figs. 8 and 12 illustrating another alternative form of the invention.
Figure 32:
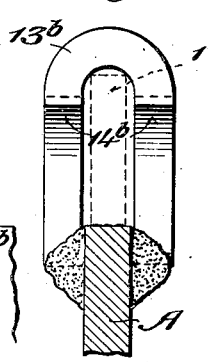
Figure 32 is an end view of the structure shown in Fig. 31.
Figure 33:
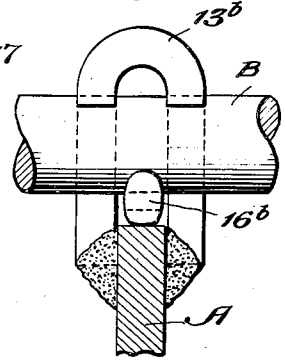
Fig. 33 is a view similar to Fig. 32 showing a cross rod fastened in place.
Figure 34:
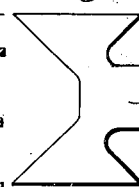
Figure 34 is a plan view of the blank from which the rod holder element of Figs. 31 to 33 is formed.
Figure 38:
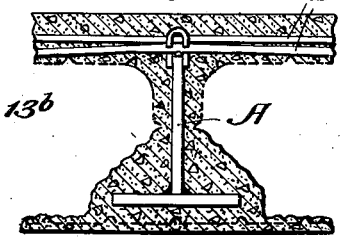

In some instances, the structural elements A may be devoid of top flanges. For example, the structural elements may be inverted T-shape in cross section. In that event saddle elements such as the saddle elements 13 or 13a may be welded or otherwise suitably fastened upon the top edges or against the sides of the webs of the structural elements or the saddle elements may be cross sectionally of inverted U-shape to straddle the top portion of the webs of the structural elements. A saddle element 13b of inverted U-shape in cross section is illustrated in Figs. 31 to 33 of the drawings, and Figs. 31 and 32 illustrate by dotted lines that a suitable wedge block 17 may be inserted into a saddle element of this kind and may rest upon the top edge of the flange of the structural element A to which the saddle element is to be applied to hold the saddle element properly positioned relative to the structural element during welding of the saddle element. The side walls of the saddle elements 13b are provided with cross rod accommodating slots 14b as described in connection with Figs. 1 to 12 of the drawings, and the cross rods are secured in said saddle elements 13b by suitable wedges 16b driven between the cross rods and the tops of the webs of the structural elements, as illustrated in Figs. 31 and 33. Obviously, the side walls of the saddle elements 13b may be sprung inwardly or outwardly relative to each other to receive therebetween the top portions of structural element webs of different thickness. Obviously, too, the structural elements 13b may be formed by stamping blanks as illustrated in Fig. 34 and by bending the blanks upon themselves into inverted U-shape.

Figure 35:
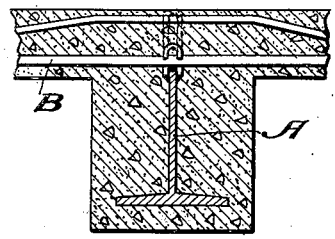
Figures 35 through 38 are sectional views illustrating the incorporation in different building structures of inverted T-beams, joists or the like equipped with cross rods in accordance with the Figs. 31 to 33 form of the invention.
Figure 36:
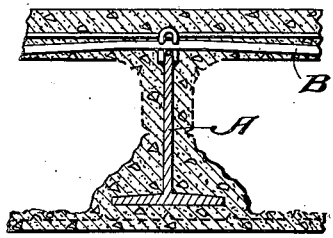
Figure 37:
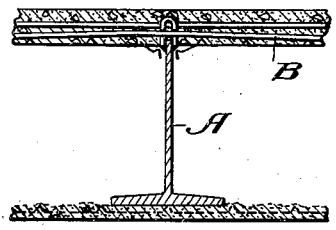

In some cases, instead of providing structural elements with only a single series of cross rods B disposed in a common horizontal plane, it may be desirable to provide the structural elements with two or more series of cross rods disposed in different horizontal planes. If so, provision for this may readily be made by equipping the structural elements with two or more series of saddle elements of any of the types described, but of different heights. This is indicated by the cross rod arrangement illustrated in Figs. 35 and 37 of the drawings.

Figs. 13 to 17 illustrate various alternative forms of saddle elements which may be employed. Fig. 13 illustrates a saddle element 13c of inverted U-shape in side elevation welded to a structure element and having a cross rod receiving opening of rectangular shape; Fig. 17 illustrates a similar saddle element 13d having foot formations 18 at its bottom and fastened to a structural element by means of rivets passing through said foot formations; Fig. 14 illustrates a similar saddle element 13e welded to a structural element and having a cross rod receiving opening with a rounded top; Fig. 15 illustrates a saddle element 13f of inverted U-shape welded to a structural element and formed by bending a bar into inverted U-shape; and Fig. 16 illustrates a saddle element 13g in the form of a ring welded to a structural element. According to either of Figs. 13 to 17 the cross rods may be fastened within the saddle elements by suitable keys, such as nails, driven between the cross rods and any appropriate wall of any of the saddle elements.

Figure 18 indicates, as heretofore mentioned, that saddle elements of the Figs. 6 or 10 type may be riveted or bolted to the structural elements.

Instead of applying the saddle elements directly to a structural element, the saddle elements may be fastened to a suitable plate 19, as indicated in Fig. 22 of the drawings, and such plate may be welded, riveted or otherwise fastened to the structural element. Moreover, in any case where the top of a structural element is reinforced in accordance with the invention, the bottom of the structural element may have equalizing metal added thereto. In this connection, Figs. 25 to 30 illustrate that the structural elements may have plates 20 or bars 21 welded, riveted or otherwise suitably fastened either upon tops or upon the bottoms of the bottom flanges thereof.

Figures 20 and 21 illustrate a construction, such, for example, as a bridge floor, in which a slab 21 of concrete or the like is superimposed upon a structural element A equipped, in accordance with the invention, with cross rods B which are embedded in the concrete or the like, and Fig. 22 illustrates a similar construction in which the saddle elements are carried by a plate fastened to the top of the structural element.

Figure 39:
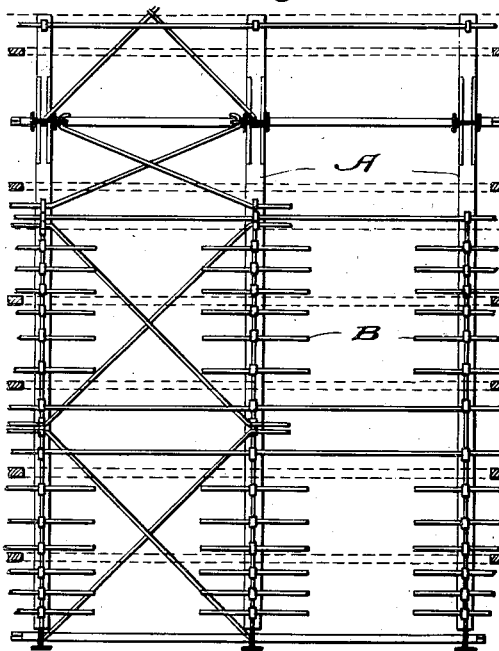
Figure 39 is a plan view of a structural steel building floor lay-out in accordance with the invention.

Figure 23 illustrates a so-called "soffit" construction in which the structural element A is encased in concrete or the like and in which some of the cross rods B are deflected downwardly relative to other of said cross rods, as indicated by dotted lines; Fig. 24 illustrates the adaptation of the invention to a structural element encased in concrete or the like according to the disclosure of my prior application, Serial No. 123,932; Fig. 25 illustrates a construction similar to that illustrated in Fig. 23 but in which the bottom of the structural element A is provided with an equalizing metal plate 20; and Figs. 35 to 38 illustrate constructions similar to Figs. 23 and 24 except that the structural element is of inverted T-shape in cross section and has two series of rods fastened thereto at different elevations by saddle elements of the type shown in Figs. 31 to 33. On the other hand, Fig. 39 illustrates that some of the cross bars B may be employed to tie together different structural elements A and that other of said cross rods may extend as brace rods diagonally between adjacent structural elements.

As illustrated in Figs. 1 to 4, the cross rods B may have fastened thereto, parallel or substantially parallel to the structural element, other rods 22 of any suitable length and of any suitable sectional size and shape, and located at any desired point or points, to, in effect, increase the top flange section of the structural element and improve the physical properties of the latter.

In all cases the cross rods coact with the structural elements and the concrete or the like in which they are embedded to provide composite beam structures in which the compression values of the concrete slab are transmitted to the steel elements by said cross rods and their saddles. Accordingly, by the use of the cross rods, great increases in strength of various structures may be obtained and, at the same time, substantial savings may be obtained in the amount of steel and concrete or the like used in different structures, with attendant advantages anent light weight. The compression forces act outwardly or toward the ends of the structural elements. Accordingly, the saddle elements preferably are placed with the open ends of their slots for facing inwardly or toward the centers of the structural elements so that solid abutments are afforded against which the cross rods act in transmitting said forces to the structural elements, both the saddle and the cross rods applying said forces mainly by their resistance to shearing forces.

Concrete and the like, the cheapest construction material, has excellent and usable compression strength and but feeble and questionable tension value, hence wherever concrete is indicated or necessary for certain functional services as floors, roofs, and certain walls in bending it is evident that by the use of this invention the concrete compression values may be gathered up and properly attached to a structural steel member to act as the part or whole compression flange or chord of said member thereby eliminating part or all of the more expensive construction material—steel—from said compression service.

Economies may thus be effected, first, by the substitution of a cheaper construction material, concrete vs. steel for compression flange or chord service, and second, in the many cases here illustrated, by using an existent and placed material for an additional service—namely, flange compression—obviously to the end that steel will be required only for tension flange, web, and saddles, since the cross or shear rods are usually existent as a part of the floor or roof construction.

Without further description it is thought that the invention will be readily understood and that the various advantages of the same will be readily apparent to those skilled in the art to which it appertains. It is desired to point out, however, while only certain specific embodiments of the invention have been illustrated and described, it is readily capable of being carried into practice in specifically different forms within its spirit and scope as defined in the appended claims.

I claim:

1. In combination with a structural steel beam element, saddles secured rigidly to the top of said element at definitely spaced points therealong, said saddles having cross rod accommodating formations closed at their tops, cross rods seated in said formations, and wedge keys interposed between the structural element and the cross rods and locking the latter in said formations.

2. In combination with a structural steel beam element, saddles secured rigidly to the top of said element at definitely spaced points therealong, said saddles each having a cross rod accommodating slot closed at its top and opening through an edge of the saddle element for insertion of a cross rod, the top of each slot being disposed above the top of its mouth, a cross rod seated in the closed top portion of the slot of each saddle element, and a wedge key interposed between the top of the structural element and each cross rod and locking the latter in their slots.

3. In combination with a structural steel beam element, saddles of inverted U-shape straddling the top of said element and secured rigidly thereto at definitely spaced points therealong, said saddles each including a pair of side walls each having a cross rod accommodating slot closed at its top and opening through an edge of the wall for insertion of a cross rod.

4. The combination as set forth in claim 3 in which the tops of the slots are disposed above their mouths.

5. The combination as set forth in claim 3 including a cross rod seated in the top portions of the slots of the side walls of each saddle element, and a wedge key interposed between the top of the structural element and each cross rod and locking the latter in the tops of its related slots.

6. In combination with a structural steel beam element, saddles secured rigidly to the top of said element at definitely spaced points therealong, said saddles having cross rod accommodating formations, cross rods seated in said formations, and wedge keys interposed between the structural element and the cross rods and locking the latter in said formations, the cross rod accommodating formations of different saddles being disposed at different elevations relative to the structural element.

7. In combination with a structural steel beam element, slotted saddle elements longitudinally extending with respect to the beam and rigidly connected therewith along the top thereof, transverse cross members seated in the slots of said saddle elements, and wedge key devices interposed between said structural element and said cross members, locking said cross members in the slots of said saddle elements.

8. A structure for composite floors and the like, comprising a plurality of spaced beams, saddle elements longitudinally disposed with respect to the beams and rigid therewith at points spaced along the top thereof, a plurality of cross rods seated in certain of said saddle elements, diagonal rods seated in other of said saddle elements of adjacent beams, and means locking said cross rods, and diagonal rods in said saddle elements.

9. A composite floor, wall, or like panel comprising: a plurality of spaced beams, saddle elements longitudinally disposed with respect to the beams and rigid therewith at points spaced along the compression side thereof, a plurality of cross rods each seated in certain of said saddle elements and projecting laterally thereof a distance less than the spacing of said beams, other cross rods each extending across a plurality of said beams and each seated in a saddle element on each of said beams, means locking said cross rods in said saddle elements, and an initially plastic slab embedding said cross rods and supported on said beams.

10. A composite concrete and metallic panel structure, comprising, a slab having metallic reenforcement embedded therein, said reenforcement including a structural beam element, saddle elements rigid in the direction of their height having their longitudinal axes extending longitudinally of the beam and rigidly secured at spaced intervals to the compression portion thereof, said saddle elements having rod receiving seats in the direction of their thickness and disposed transversely of the beam, and cross rods seated in said saddle elements.

MEIER GEORGE HILPERT.